(12) United States Patent
Bocanegra et al.

(10) Patent No.: US 6,721,480 B1
(45) Date of Patent: Apr. 13, 2004

(54) OPTICAL FIBER CABLES

(75) Inventors: Luis M. Bocanegra, Alpharetta, GA (US); Harold P. Debban, Snellville, GA (US); Jennifer R. Meeks, Lawrenceville, GA (US); Kenneth L. Taylor, Lawrenceville, GA (US); Peter A. Weimann, Atlanta, GA (US)

(73) Assignee: Furukawa Electric North America Inc., Norcross, GA (US)

( * ) Notice: Subject to any disclaimer, the term of this patent is extended or adjusted under 35 U.S.C. 154(b) by 0 days.

(21) Appl. No.: 10/420,309

(22) Filed: Apr. 22, 2003

(51) Int. Cl.$^7$ .................................................. G02B 6/44
(52) U.S. Cl. ...................................................... 385/114
(58) Field of Search ................................ 385/114, 113, 385/112, 111, 110, 109

(56) References Cited

U.S. PATENT DOCUMENTS

| | | |
|---|---|---|
| 4,900,126 A | 2/1990 | Jackson et al. |
| 5,193,134 A * | 3/1993 | Pizzorno et al. ............ 385/105 |
| 5,384,880 A * | 1/1995 | Keller et al. ................ 385/109 |
| 5,457,762 A * | 10/1995 | Lochkovic et al. ......... 385/114 |
| 5,748,823 A * | 5/1998 | Nave ........................... 385/113 |
| 6,329,113 B1 * | 12/2001 | Bourdelais et al. ........... 430/60 |
| 2003/0156811 A1 * | 8/2003 | Ino et al. .................... 385/128 |

* cited by examiner

*Primary Examiner*—Chandrika Prasad
(74) *Attorney, Agent, or Firm*—Peter V. D. Wilde

(57) ABSTRACT

The specification describes an improved optical fiber ribbon cable. The cable design addresses the problem of wrinkles in the cable coating that occur on the interior bend radius on moderate bending of the cable. The wrinkles are much smaller than the bend radius, and are, relatively speaking, microbends. These may cause microbending losses in the fibers even where the bend radius is relatively large. The cable design of the invention has a combination of three important features. The cable cross section is round. The encasement for the optical fiber stack is relatively hard, and is deliberately made to adhere to the optical fiber stack. Consequently the encasement medium functions as an effective stress translating medium that deliberately translates stresses on the cable to the optical fibers. The optical fibers function as compressive strength members to retard longitudinal strain on the cables, and thereby reduce wrinkling of the encasement.

7 Claims, 4 Drawing Sheets

OPTICAL FIBER CABLES

FIELD OF THE INVENTION

This invention relates to optical fiber cables having improved optical transmission characteristics. More particularly, it relates to lightwave transmission cables with optical fiber ribbon assemblies designed to reduce bending losses.

BACKGROUND OF THE INVENTION

High capacity lightwave transmission cables frequently comprise multiple optical fibers organized in a ribbon configuration. Optical fiber ribbons are made by arranging two or more optical fibers side-by-side and coating the optical fibers to bind them together in a single planar array. One or more optical fiber ribbons may then be cabled in a single cable for high capacity optical transmission systems. Where more than one ribbon is used, an efficient arrangement is to stack the optical fiber ribbons, and apply a cable jacket to surround and protect the stack. The stack typically has a rectangular cross section. An advantage of stacked optical fiber ribbon cables is that the individual optical fibers remain organized throughout the cable length during the cabling operation, and in use. Thus for relatively small optical fiber count cables the input and output ends of a given optical fiber are easily matched. (For large count cables color-coded coatings on the ribbons or the fibers typically identify the fiber ends.) Another important advantage of stacked ribbon cables is space efficiency. The cable volume required per optical fiber in a stacked ribbon configuration is typically less than that for a given fiber in a loose fiber bundle.

It has long been recognized that bending of optical fibers is a principal signal loss mechanism. The smaller the bend radius (microbend) the more light escapes from the core of the fiber and is lost. When multiple fibers are arrayed in a cable, the microbending problem is influenced by the nature of the array, since bundles of fibers mechanically interact with one another, as well as with the cable sleeve. The use of optical fibers arrayed in ribbons controls that interaction to some degree, but optical fiber ribbons have their own unique microbending behavior. In an optical fiber ribbon with a rectangular cross section, the out-of-plane bending stiffness is significantly lower than the in-plane bending stiffness, giving rise to the so-called preferred bending axis. Among other consequences, this preferential bending characteristic can cause nonrandom stresses on certain fibers in the ribbon during cable loading. These stresses may degrade the signal transmission characteristics of the optical fibers in the cable. Thus optical fiber ribbons present special considerations in cabling.

It is also universally recognized in optical fiber cable design that a preferred approach to controlling microbending losses is to mechanically decouple the optical fibers from the surrounding cable. In this way mechanical impacts and stresses on the cable are not translated, or minimally translated, to the optical fibers. Various techniques have been used to achieve this. Early approaches involved placing the optical fiber(s) loosely in a relatively rigid tube. The object was to allow the fibers to "float" in the tube. In alternative designs, the optical fibers are coated with a primary coating, typically a polymer coating, and a cable sheath applied over the coating, also typically a polymer. The primary coating in this case is made soft, so that stresses experienced by the cable are inefficiently translated to the optical fibers within the cable. In yet another design aimed at the same goal, the optical fibers are coated with a gel to reduce mechanical coupling between the optical fibers and the surrounding cable sheath. See U.S. Pat. No. 6,035,087, issued Mar. 7, 2000.

The term "encasement" as used herein is defined as the primary medium that surrounds the optical fiber ribbon stack.

These techniques as applied to ribbon cable have only moderate success. This is partly due to the tendency of ribbons within the cable to buckle or wrinkle when the cable is moderately bent. The wrinkles form on the inside radius of the bend. Whereas the bend itself may have a relatively large radius, a radius that is above the range where serious microbending losses would occur, the bends of the wrinkles are much smaller, and easily translate to the optical fibers causing microbending loss. Thus a technique for eliminating or minimizing these ribbon wrinkles in optical fiber cables would represent an important advance in the technology.

A particularly thorough discussion of coatings or encasements for optical fiber ribbon cables appears in U.S. Pat. No. 6,317,542 issued Nov. 13, 2001. This patent describes a variety of embodiments wherein conformal encasements are used for optical fiber ribbon stacks. The discussion of optical fiber ribbon stacks is especially relevant to the discussion below, and this patent is incorporated by reference herein. The term stack as used herein includes one or more optical fiber ribbons.

STATEMENT OF THE INVENTION

We have discovered that, contrary to conventional practice, increasing the coupling between the optical fibers and the surrounding cable provides unexpected benefits, and reduces the tendency of optical fiber cables to buckle and wrinkle. This effect is especially pronounced if the optical fibers collectively exhibit a preferred bending axis, for example, an optical fiber ribbon. Increased coupling and reduced microbending loss is achieved by a combination of three features. First, a relatively high modulus encasement is used. Second, adhesion between the optical fiber ribbon and the encasement is promoted. The combination of a relatively stiff medium surrounding the optical fiber ribbon and relatively high adhesion between the optical fiber ribbon and the surrounding medium is important to allow stresses on the cable exterior to be translated to the optical fiber ribbon. Translating the stresses to the optical fiber ribbon allows the glass fibers in the optical fiber ribbon to be used as compression strength members. Inhibiting compressive strain on the optical fiber ribbon cable reduces markedly the tendency of the optical fiber ribbon(s) to form wrinkles on the interior of the bend radius. A measure of the effectiveness of this is the shrinkage factor of the encasement with respect to the optical fiber ribbon stack, as will be described in more detail below.

DETAILED DESCRIPTION

Figure 1:
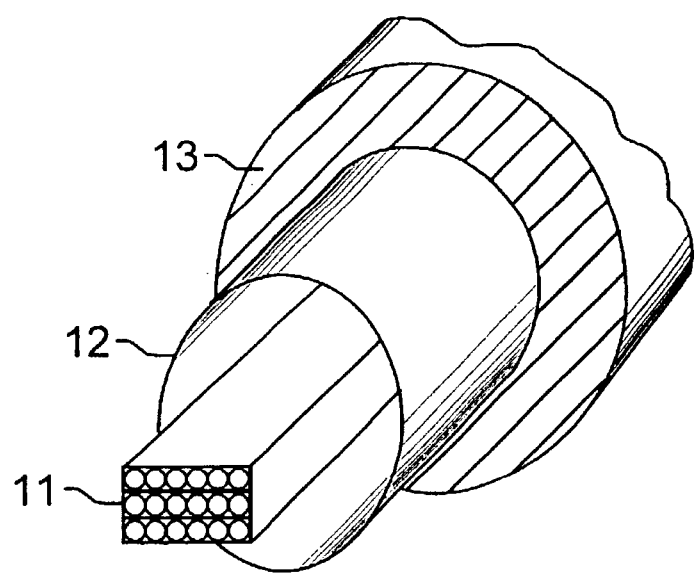
FIG. 1 is a perspective view of one prior art approach to cabling optical fiber ribbon stacks to minimize coupling of the stack to the cable structure.

Referring to FIG. 1, an optical fiber ribbon stack 11 is shown encased in a cable sheath. The cable sheath comprises tube 12 and tube coating 13. In this illustration, the optical fiber ribbon stack assembly has three ribbons, each ribbon with six fibers. Ribbons with four or eight fibers and more, are common and commercially available. It will be understood that these numbers are arbitrary for the purpose of illustration. For more details on the structure of optical fiber ribbons see U.S. Pat. No. 4,900,126, which is incorporated by reference herein. The number of fibers per ribbon may range from two to more than twenty. The number of ribbons in the stack may also vary substantially from the three ribbons illustrated here. These numbers will determine the aspect ratio of the stack, i.e. the width vs. height. Optical fiber ribbons may be stacked with the plane of the ribbons the long dimension of the stack, or the short dimension. In the latter case, there typically will be more optical fiber ribbons than optical fibers per ribbon. Thus it will be appreciated that a wide variety of configurations for the optical fiber ribbon stack are useful in the context of the invention. Optical fiber cables with a single ribbon are also to be considered within the scope of the invention. The arrangement shown in these figures is only by way of example.

In the embodiment of FIG. 1, the optical fiber stack 11 is essentially completely decoupled from the sheath tube 12. This is a so-called "loose tube" assembly, which is designed to allow the optical fiber stack to "float" inside the tube. When small bends or dents occur in the tube they are minimally translated to the optical fibers.

Figure 2:
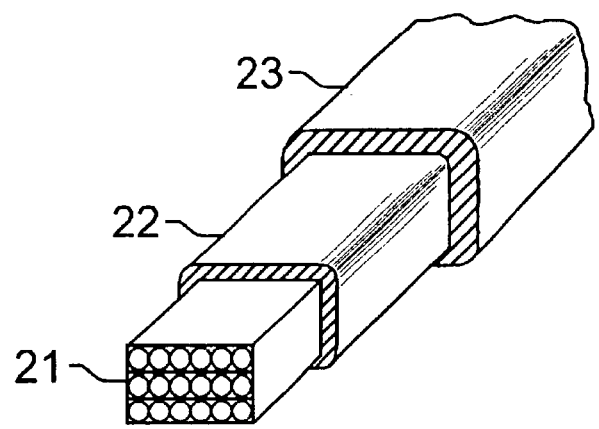
FIG. 2 is a perspective view of a second prior art approach to cabling optical fiber ribbon stacks.

An alternative optical fiber ribbon stack cable design is shown in FIG. 2. For more details on this design, refer to U.S. Pat. No. 6,317,542. The optical fiber ribbon stack is shown at 21, with a primary encasement 22 surrounding the optical fiber ribbon stack. A second coating layer 23 is shown formed over the encasement layer 22. In this design, stresses on the outside surface of the cable are decoupled from the optical fiber ribbon stack by two mechanisms. One, the encasement layer 22 is made of a relatively soft material. Intuitively, it can be appreciated that if the material 22 is soft, it is an inefficient force-translating medium. This may be viewed as an extension of the design theory of FIG. 1, where the material 22 is non-existent. The second mechanism for reducing force translation between the optical fiber ribbon stack and the encasement is to minimize the adhesion between the optical fiber ribbon stack and the encasement. If the optical fiber ribbon stack is free to slide within the encasement, tensile and compressive forces are less effectively coupled between them.

Figure 3:
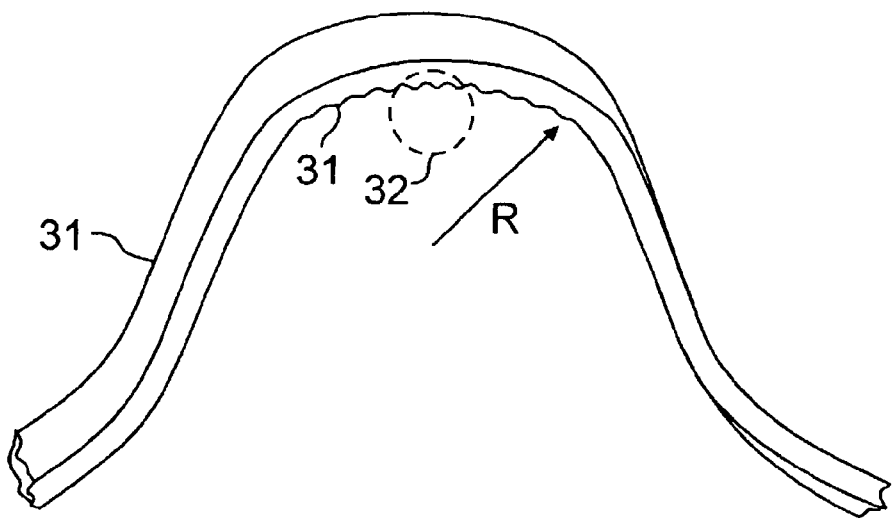
FIG. 3 is a schematic diagram illustrating the problem of wrinkling of the optical fiber ribbon stack encasement upon moderate bending of the cable.
Figure 4:
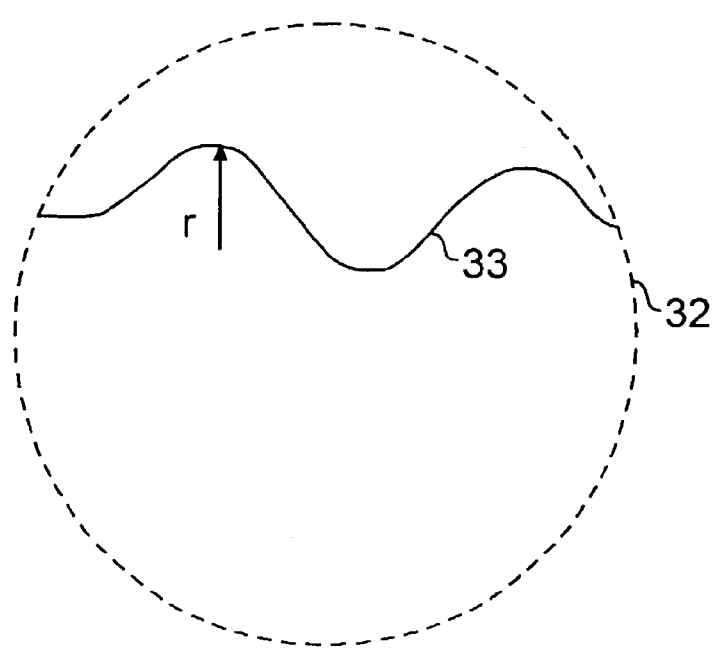
FIG. 4 is a schematic view showing the wrinkles of FIG. 3 in more detail.

Additionally, the optical fiber ribbon stack cable design of FIG. 2 has a conformal encasement. There are several aspects of this that will be discussed in more detail below. However, it can be observed here that just as the optical fiber ribbon stack has a preferred bending axis, the encasement 22, and the secondary coating 23, also have preferred bending axes, axes that correspond to the preferred bending axis of the optical fiber ribbon stack. Thus this design has a very strong preferred bending axis. Due in part to that, the encasement has a tendency to buckle if the cable is subject to modest bending. This causes wrinkles to form in the encasement (as well as in the secondary coating 23). FIG. 3 illustrates this behavior. Optical fiber ribbon cable 31 is shown with a bend having approximate radius R. Wrinkles form on the inner side of the bend radius as shown at 31. The wrinkles tend to have a corrugated pattern that is seen in more detail in FIG. 4. As is evident, FIG. 4 is an enlargement of the circle 32 of FIG. 3. Whereas the stresses on the optical fiber ribbon stack resulting from a relatively large bend with radius R may not adversely affect the transmission characteristics of the optical fiber ribbon stack, the second order effect of the stresses from the wrinkles 33 (FIG. 4), with smaller radius r, may have significant detrimental effect.

Figure 5:
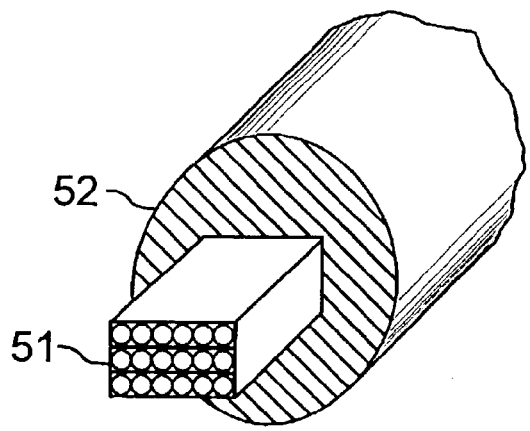
FIG. 5 is a perspective view of one embodiment of the optical fiber ribbon cable of the invention.

The optical fiber ribbon stack cable of the invention is designed to overcome or reduce the effect just described. The design of the invention is shown in FIG. 5, where the optical fiber ribbon stack is shown at 51 and an encasement at 52. The encasement has two important features that are contrary to the trends in the prior art. First, the material of encasement 52 is relatively rigid. This allows stresses on the outside of the encasement to be deliberately translated to the optical fiber ribbon stack. For this function it is recommended that the material of encasement 52 have an elastic modulus of more than 210 MPa, and preferably more than 300 MPa. Preferred specific materials for the encasement are polyolefins and ester-based polymers such as polyethylene, polypropylene, polyvinylchloride, ethylene-vinyl acetate polymers, ethylene acrylic acid polymers, ester-based polymers, and co-polymers of the foregoing. These materials are given by way of example are not limiting of potential suitable materials. In each case the density and other properties of the polymers may be tailored by methods well known in the art to provide the mechanical characteristics of the invention, as well as other desired properties. For example, optical fiber ribbon stack cables that are used inside buildings may require fire-retardant polymers. An example is DGDA-1638-NT, a fire-retardant low-smoke zero-halogen resin available from the Dow Chemical Company. At 23° C., this material has an elastic modulus of approximately 213 MPa. A non-fire retardant preferred material is DFDA-6115, a low-density polyethylene available from Dow Chemical Co. This material has an elastic modulus of approximately 213 MPa at 23° C.

A second feature of the encasement 52 is that it is made to adhere to the optical fiber ribbon stack. The combination of moderate adhesion between the optical fiber ribbon stack and the encasement, and a relatively stiff encasement medium, effectively translates stress to the optical fibers in the optical fiber ribbon stack. It is well known that glass fibers have high stiffness, both in tension and compression. In the optical fiber ribbon stack cable design of FIG. 5, the glass fibers act as compressive strength members, effectively preventing the cable from buckling or otherwise distorting. Long, slender structures such as fibers or ribbons are limited in their ability to act as a compressive stiffness member due to buckling. Once buckled, the effective compressive stiffness of the structure is dramatically lowered, and in some cases, effectively disappears. The presence of the encasement medium tends to retard the onset of buckling by increasing the compression strain energy threshold required to trigger the elastic instability. Thus an encasement formed according to the invention enables the fiber ribbon to carry a greater compressive load or strain before buckling.

Furthermore, the encasement can act as a tangent stiffness matrix in the buckled state, restricting the magnitude of the lateral deflection of the ribbon and minimizing the extent to which the buckling reduces the effective compressive stiffness. A more specific discussion of these features is given below.

Figure 6:
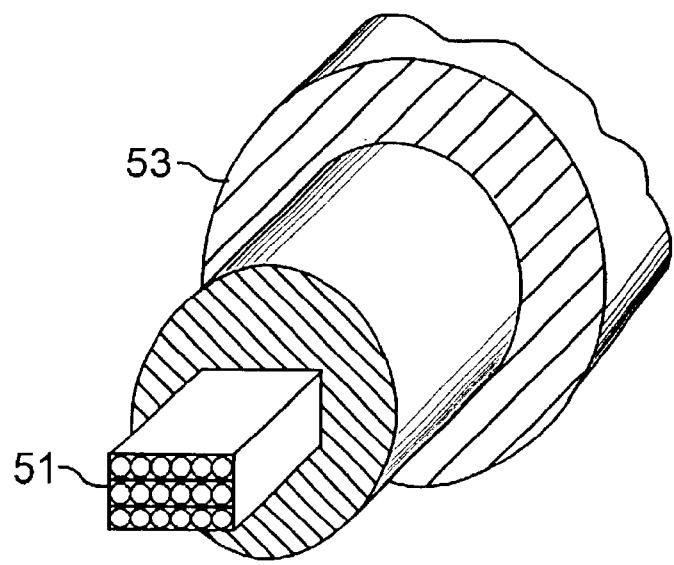
FIG. 6 is a perspective view of another embodiment of the optical fiber ribbon cable of the invention.

As shown in FIG. 6, the encased optical fiber ribbon stack may be provided with one or more additional outer layers 53. Typically these outer layers will be polymers with properties tailored to the intended application for the cable. The outer layer may be flame retardant, for customer premises applications. It may be specially designed for air blown installations. See U.S. patent application Ser. No. 10/233,719, filed Sep. 3, 2002, incorporated by reference herein. The outer layer 53 is preferably harder than coating 52, with a modulus of 250–2000 MPa. Other details of appropriate outer layer materials may be found in U.S. Pat. No. 6,317,542.

When added cable strength is desired, a layer of fiberglass or aramid yarn may be provided between the encasement and an outer layer. This provides added tensile strength for cable pulling operations.

For very high density (capacity) cables, more than one of the cable structures described above may be contained in a single cable, either stranded around a central member (as in a loose tube cable) or contained at the core of a central core cable. In this case, the multiple units within one cable may be "broken out" for convenient routing in customer premises or closures.

The mechanical performance, and the related optical properties of the optical fiber ribbon stack 51, will be strongly influenced by the material properties (as described above) and dimensions of the encasement layer 52. The outside diameter of the encasement layer may be related to the dimensions of the optical fiber ribbon stack using the diagrams of FIG. 7 to define the measurements. The optical fiber ribbon stack will have a height and width as shown, which may be equal but will typically have a width to height ratio of 1-2. The diagonal of the optical fiber ribbon stack, $d_S$, is $(h^2+w^2)^{1/2}$. For convenience, $d_S$ will be taken as the relevant dimension for defining suitable thickness values for the encasement layer 52. This will ensure that sufficient coating material is provided at the corners of the optical fiber ribbon stack for protection of the optical fiber ribbon stack (refer to $t_2$ in FIG. 7), and unitary strength of the encasement layer. The outer diameter of the encasement layer, designated $d_E$ in FIG. 7, may then be prescribed as $d_S+2t_2$. The preferred range for the thickness $t_2$ at the corners of the optical fiber ribbon stack is 3–15 mils. This dimension is defined as the minimum thickness of the encasement. The overall diameter $d_E$ of the encasement layer and the optical fiber ribbon stack, in mils, is:

$$d_E=d_S+(6-30).$$

In the optical fiber ribbon stack shown in these figures, there are six optical fibers per ribbon, and three or four ribbons per stack. Typical dimensions for a four ribbon stack are:

h=48 mils w=110 mils $d_S$=120 mils $d_E$=140 mils

Figure 7:
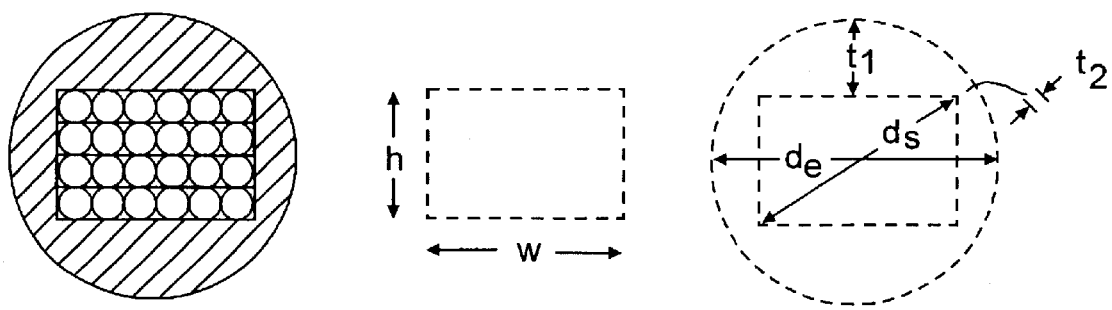
FIG. 7 gives diagrams of the optical fiber ribbon cable of FIG. 5 showing dimensions relevant to the description of the features of the invention.
Figure 8:
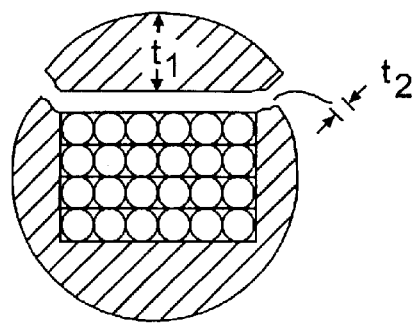
FIG. 8 is a schematic view illustrating stripping of the optical fiber ribbon cable of the invention.

The cross section of the encasement 52 is specifically and deliberately round. This configuration is preferred for ease in manufacture, ease in installation, and for other important reasons. For example, it will be evident on inspection of FIG. 7, for example, that the amount of material available to cushion the optical fiber ribbon stack when the cable is bent on the preferred bending axis is substantial, i.e. thickness $t_1$ in FIG. 7 is greater than thickness $t_2$. Since the optical fiber ribbons are flexible, this provides additional stress relief where it is most desired. Moreover, it will be evident that the preferred bending axis of both of the cable structures shown in FIGS. 5 and 6 is attenuated by the. encasement layer 52 (FIG. 5), or the combination of layers 52 and 53 (FIG. 6). This allows the stresses that produce the wrinkles (FIGS. 3 and 4) to be distributed more effectively around the outside surface of the cable, thereby reducing the tendency of the ribbon to buckle or form wrinkles.

Another important advantage of the structure represented by FIG. 7, i.e. an optical fiber ribbon stack cable with a round cross section, is that there is a built-in tear strip. This is illustrated in FIG. 7, where the force required to tear the encasement layer 52 is much smaller at the corners of the optical fiber ribbon stack than at other places around the cable circumference. This built-in tear strip comes with no additional cost or processing. The thickness $t_2$ of the encasement layer 52 is preferably designed to allow ease of tearing. The thickness required for this will depend on the properties of the material that forms layer 52. As an example, for typical low-density polyethylenes, the dimension $t_2$ is preferably 3–10 mils.

The amount of adhesion desired between the optical fiber ribbon stack and the surrounding encasement may vary substantially depending on the system design. If adhesion is too low, stress on encasement layer 52 will not be effectively translated to the optical fiber ribbon stack.

For meaningful quantitative measures of adhesion a uniform test procedure should be established and followed. Adhesion values will vary substantially depending on the nature of the article being tested, and the test procedure. Pull tests may be used to measure this property in optical fiber cable. This is a relatively simple test in which the encasement is held stationary, and one or more of the optical fiber ribbons are pulled from the encasement. The adhesion between the optical fiber ribbons and the encasement is measured mostly in a shear mode rather than the more common tensile mode (where the force measured is that required to separate two surfaces by force applied normal to one of the surfaces). However, in an optical fiber ribbon cable, longitudinal forces are more relevant, in the context of the invention, than forces normal to the cable surface. In view of this the pull test procedure described below is the more valid adhesion test.

1. Cut 5 specimens of the encased ribbon 4¼ inches (114.3 mm) long from a spool.
2. With a permanent marker, mark a section 1-inch long in the center of each sample.
3. If there is no outermost layer, skip to step 4. If there is an outer layer of jacketing, remove it as follows: Using a razor blade, score around the circumference of the outer tube along one marking. Score from this cut longitudinally down the shorter end of the tube to the end. Remove the outer layer of tubing from this section.
4. Cut the encasement longitudinally along the side of one of the ribbons from one marking to the end. Then, cut the encasement (circumferentially) at the marking, being careful not to cut the ribbons. The encasement should come off, leaving only ribbons exposed past the marking.
5. On the other end, use a razor blade to cut the tube almost in half, along one of the ribbons to the mark.

Peel back the encasement and the outer shell (if there is one) from the ribbons. Cut the ribbons off as close to the mark as possible. This should leave a tube sliced in half, without ribbons up to the mark on this side.

6. The specimen should only be completely intact and unchanged within the 1-inch gauge length between the marks.
7. Repeat steps 1–6 to create total of 5 specimens.
8. Using 2-part Hardman 5 minute epoxy, or similar quick-setting material, coat the exposed ribbon stack on each sample with glue, securing them together. Be careful not to glue the ribbons to the 1-inch gauge length in the center.
9. Using the same epoxy, secure the two "half tubes" on the other end together, coating them in epoxy. Be careful not to get any epoxy on the cut-off exposed ribbons.
10. Let the epoxy dry for about 30 minutes. Trim the epoxy with scissors if any large clumps exist.
11. Use a tensile testing machine, such as one manufactured by the Instron Corporation, fitted with an appropriate load cell and pneumatic C-clamp grips for pull-out tests. The distance between the clamps should be 1½ inches. The crosshead speed for the test is 1 inch/min. Center the sample gauge length between the clamps for each test.
12. Test all 5 samples. Data is recorded as load vs. displacement. The desired results from the test are maximum load, and energy (defined as the area under the curve between designated displacements). The displacements used in this test were 0.0 inches and 0.5 inches. Report the average maximum load and average energy for the 5 samples. "Adhesion" is reported as the maximum load measured during the test.

Note that in this test, the optical fiber ribbon stack is pulled, not individual ribbons. This measures the adhesive force between the encasement and the optical fiber ribbon stack, and is therefore relatively unaffected by the adhesive force between the ribbons themselves.

Pull test data on an optical fiber ribbon stack cable with two ribbons having six fibers per ribbon resulted in an adhesion of 5.47 lb (24.33N). The energy required to pull the optical fiber ribbon stack from the encasement was 1.68 lbf-in (2.94 N-cm). The encasement was a low-density polyethylene and the coating on the optical fiber ribbons was a UV cured acrylate.

For a comparative test, a similar unit was prepared that had a coating of polyalphaolefin oil to reduce the adhesion between the optical fiber ribbon stack and the encasement. The maximum adhesion measured for this case was 0.97 lbs (3.87 N). The energy required in this case was 0.118 lbf-in (0.21 N-cm).

These values will vary depending on the cable size and configuration, the materials used for the optical fiber ribbon coating, the material used for the encasement, the temperature of the cable when measured, etc. Therefore it is imprecise to attach a specific value or range to the adhesion recommended for the invention. However, it may be specified that preferably no adhesion retarder (lubricant) should be used. This can be defined as having the encasement layer and the optical fiber ribbon stack in intimate contact. Alternatively, the predominant portion of the optical fiber ribbon stack (accounting for small surface regions that may be occupied by bundling and/or waterblocking material, e.g. yarn) and the encasement are defined as adjoining, meaning touching, with no other material in between.

The encasement may comprise more than one layer, each having the properties indicated. In some cases, it may be advantageous to have an inner adhesive encasement layer adjoining the optical fiber stack.

Normally adhesion in the desired range will occur as the result of the intrinsic material characteristics, i.e. the polymer-to-polymer intrinsic adhesion. The result desired, i.e. the adhesion recommended, is easily obtained using known extrusion manufacturing methods. Other approaches may also be found useful. For example, the encasement may be a UV curable polymer, and applied by conventional UV cured coating techniques.

Another important property in the context of the invention is the shrinkage of the encasement layer. This is an alternative indication of the main property of interest, i.e. the effectiveness with which compressive force on the outside of the encasement is translated to the optical fiber ribbon stack. To determine this, the nominal shrinkage of the encasement materials is known or measured. Then the degree to which that shrinkage is reduced in the cabled product is a measure of the degree to which the optical fiber ribbon stack and the encasement are "attached".

Shrinkage in cable technology is well known and understood. It is commonly referred to as "shrinkback" and is the phenomenon where a unit becomes shorter upon extended exposure to high temperature. This phenomenon occurs due to the relaxation/equilibration of the polymeric materials used as the jacket/encasement of the unit. Polymer chains trapped in high-energy stretched configurations can relax and shrink at high temperature; also, in units made from semicrystalline polymers (as in this case), secondary crystallization can occur, in which the density of the unit may increase (with resulting shrinkage of the unit).

To test shrinkback in the context of this invention, approximately 10-inch lengths of the unit were cut and held at 85° C. for 90 minutes to drive shrinkback. Further experiments confirmed that 90 minutes was sufficient for these units to reach equilibrium. For the encased units, we measured shrinkback of 0.22%, on average. For comparison, we slit other encased units longitudinally and removed the ribbons; these exhibited an average shrinkback of 2.33%. This means that the shrinkage of the encased (cabled) unit is reduced by 90% and shows that by encasing the ribbons in the unit, an effective composite is produced in which the fiber ribbons reinforce the encasing medium.

In contrast to the quantitative adhesion measurement, the shrinkage measurement is easily quantified. Moreover, this measurement reflects the combination of properties desired, i.e. the adhesion between the optical fiber ribbon stack, and the elastic modulus of the encasement material. If no shrinkage, or low shrinkage occurs, this means that the optical fiber ribbon stack and the encasement are effectively coupled, and that the optical fiber ribbon stack is reinforcing the unit against compressive force. That is a goal of the invention. Accordingly, it is meaningful to prescribe that in the preferred case the shrinkage of the optical fiber ribbon stack cable unit (with the encasement applied), measured at equilibrium at 85° C., is less than 40%, and preferably less than 20%, of the intrinsic shrinkage of the encasement material.

The term "encasement" is used herein to describe the primary medium 52 that surrounds the optical fiber ribbon stack. As indicated earlier, there may or may not be an additional coating or cable sheath in the optical fiber ribbon cable product of the invention.

Various additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. Optical fiber cable comprising:

(a) an optical fiber ribbon stack, (b) an encasement encasing the optical fiber ribbon stack and adjoining a predominant portion of the optical fiber ribbon stack, the invention characterized in that the encasement comprises a polymer having the following properties:

(i) an essentially circular cross section, (ii) an elastic modulus greater than 210 MPa at 23° C., the optical fiber ribbon stack and the encasement forming the optical fiber cable.

2. The optical fiber cable of claim 1 wherein the shrinkage of the optical fiber cable as measured by heating to 85° C. is less than 40% of the shrinkage of the material forming the encasement as measured by heating to 85° C.

3. The optical fiber cable of claim 2 wherein the shrinkage of the optical fiber cable as measured by heating to 85° C. is less than 20% of the shrinkage of the material forming the encasement as measured by heating to 85° C.

4. The optical fiber cable of claim 1 additionally includes an additional polymer layer over the encasement.

5. The optical fiber cable of claim 4 wherein the additional polymer layer has an elastic modulus greater than that of the primary encasement.

6. The optical fiber cable of claim 1 wherein the minimum thickness of the encasement layer is in the range 3–15 mils.

7. The optical fiber cable of claim 1 wherein the encasement is low density polyethylene.

* * * * *